No. 802,444. PATENTED OCT. 24, 1905.
D. B. DATE.
MEAT TENDERER.
APPLICATION FILED DEC. 23, 1903.
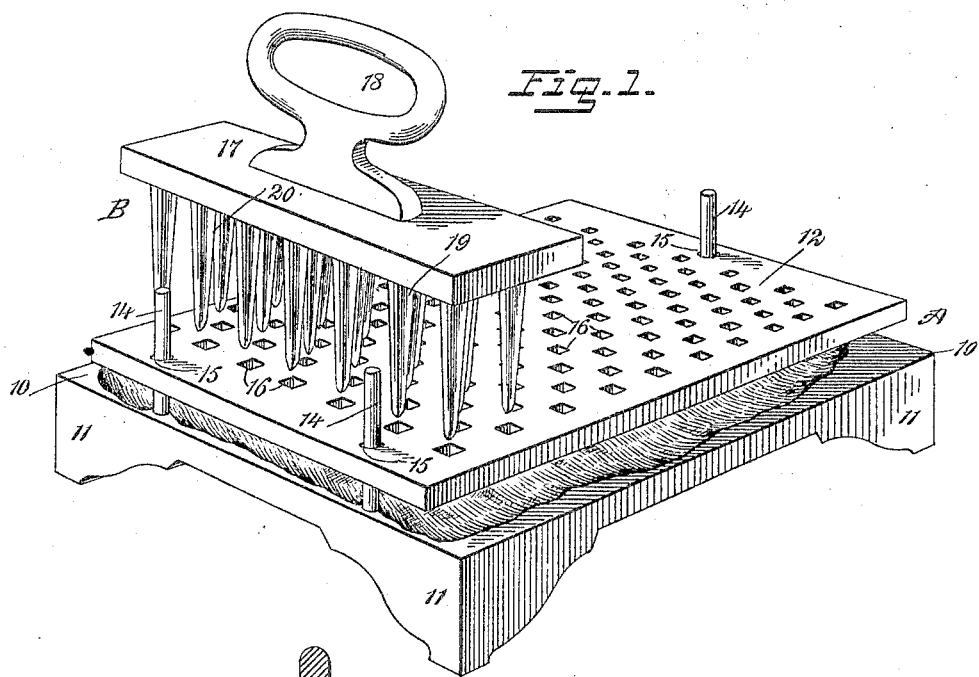
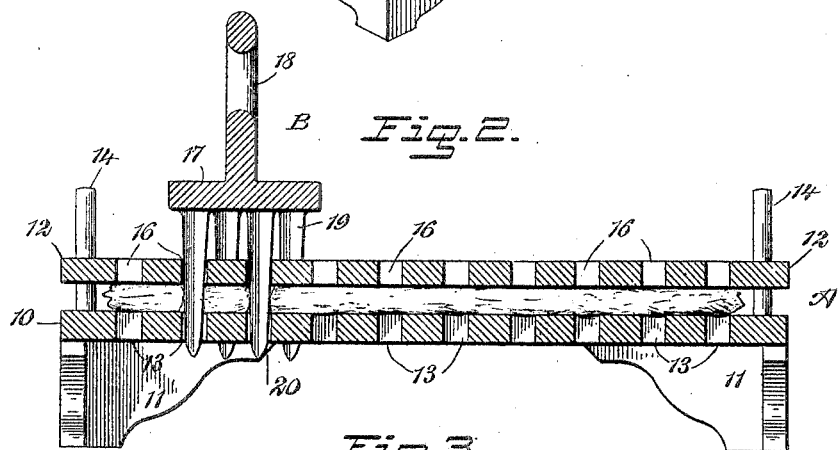
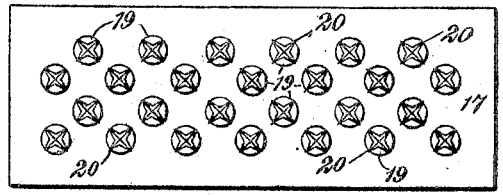
WITNESSES:
James F. Duhamel.
INVENTOR
David B. Date
BY
ATTORNEYS.

UNITED STATES PATENT OFFICE.

DAVID BEEBE DATE, OF NORTH FRANKLIN, CONNECTICUT.

MEAT-TENDERER.

No. 802,444. Specification of Letters Patent. Patented Oct. 24, 1905.

Application filed December 23, 1903. Serial No. 186,326.

*To all whom it may concern:*

Be it known that I, DAVID BEEBE DATE, a citizen of the United States, and a resident of North Franklin, in the county of New London and State of Connecticut, have invented a new and Improved Meat-Tenderer, of which the following is a full, clear, and exact description.

The purpose of the invention is to provide a meat-tenderer of exceedingly simple, durable, and economic construction and which can be conveniently and quickly manipulated and which will effectually sever or break down all sinewy particles in the meat and yet leave the meat in a connected, compact, and tender condition.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved meat-tenderer. Fig. 2 is a vertical section through the same; and Fig. 3 is a bottom plan view of the tendering-tool.

The device consists, primarily, of a body-section A and a tendering-tool B, used in connection with the body. The body A consists of a bed-plate 10, having suitable feet 11 applied to hold it elevated from a support, and a combined pressure and guide plate 12 of practically the same dimensions and form as the working section of the bed-plate. The two plates 10 and 12 are shown rectangular in the drawings; but I desire it to be understood that they may be of any suitable contour. The bed-plate 10 is provided with a series of openings 13, arranged as closely together as possible consistent with strength, and said openings 13 are preferably square, as shown. The said base-plate is further provided with upwardly-extending dowels or pins 14 opposite the plain or marginal portions of said plate 10. Ordinarily three of these pins or dowels are employed—two near one edge and one near the opposing edge—the single pin or dowel occupying a position about central with relation to the space between the two pins, as is shown in Fig. 1; but a greater or lesser number of pins or dowels may be used. The combined pressure and guide plate 12 has apertures 15 to receive the pins or dowels 14, and the said plate 12 is capable of lying flat on the bed-plate and is held against lateral movement when in such position by the dowels. Said combined pressure and guide plate has a series of square openings 16 produced therein which occupy corresponding positions to the apertures 13 in the bed-plate and register with the apertures 13 when the pressure and guide plate 12 is held in position by the pins or dowels 14, as is shown in Fig. 2.

In producing the openings 13 and 16 in the plates 10 and 12 they are arranged in rows and at equal distances apart, the openings in one row being opposite the spaces between the openings in the next row, as is shown in Fig. 1.

The tendering-tool B consists of a body 17, usually rectangular, a handle 18, secured to the upper surface of the body, and puncturing-fingers 19, which are secured to or may be integral with the under surface of the body and extend at a right angle therefrom. These fingers 19 are shown circular where they join the body 17; but the fingers taper longitudinally, approaching a point at their free or outer ends, and said fingers are stellated in cross-section between the body 17 and their pointed ends, whereby the fingers have a multiple of longitudinal cutting edges 20, as is shown in Fig. 3. The fingers 19 of the tendering-tool have an arrangement corresponding to the arrangement of the openings 13 and 16 in the plates 10 and 12, being in staggered rows, and the number of pins in the rows correspond to the number of similarly-grouped rows of openings 13 and 16 in the plates 10 and 12, counting, for example, transversely of the plates.

In operating the meat to be treated is placed smoothly upon the bed-plate 10 and the combined pressure and guide plate 12 is made to receive the pins or dowels 14 and to rest upon the upper surface of the meat, as is shown in Figs. 1 and 2. Then, as is shown in the same figures, the fingers 19 of the tendering-tool B are made to enter the openings of a certain number of rows in the two plates 10 and 12, and the tool is pressed down until its body comes in contact with the upper plate 12, whereupon the fingers penetrate the meat, their cutting edges severing the sinews and other particles in their path, the ends of the fingers extending below the bed-plate 10. The tool B is then withdrawn and its fingers are passed into other openings in the plates 10 and 12. The operation is repeated until the entire surface of the meat has been satisfactorily worked over.

The peculiar shape of the fingers 19 prevents particles of meat being forced downward or drawn upward through the openings in the plates 10 and 12 during the operation of tendering and so act upon the meat as to thoroughly disintegrate it, yet the meat is left in a connected mass and may be so transferred to the pan or broiler.

Having thus described my invention, I claim as new and desire to secure by Letters Patent—

1. A meat-tenderer comprising a bed-plate and a combined pressure and guide plate, said plates having corresponding openings, means for holding one plate over the other with their openings in registry, and a tendering-tool having tapering fingers each formed with a plurality of cutting edges extending lengthwise of the fingers approximately throughout their length, the fingers being adapted to enter sundry of the said alining openings, as described.

2. A meat-tenderer comprising a bed-plate provided with feet to hold it elevated and a combined pressure and guide plate, said plates having corresponding openings arranged in rows, the openings in one row being opposite the spaces between the openings in the next row, means for holding one plate over the other with their openings in registry, and a tendering-tool, comprising a body and fingers having longitudinal cutting edges, which fingers are arranged to simultaneously enter a given number of registering apertures in the plates the ends of the fingers extending below the body-plate when the tool is pressed down, substantially as described.

3. In a meat-tenderer, a body-section consisting of a base-plate adapted to receive meat, a combined pressure and guide plate, said plates having corresponding openings, means for positioning said guide-plate over the base-plate with their openings in registry, and a tendering-tool provided with combined piercing and cutting fingers, stellated in cross-section and adapted at one operation of the tool to simultaneously enter and pass through certain of the said openings, as specified.

4. In a meat-tenderer, the combination with a bed-plate and guide-pins extending upward therefrom, and a combined pressure and guide plate apertured to receive the pins, the two plates being provided with rectangular openings adapted to register when one plate is over the other, of a tendering-tool comprising a body and fingers extending from the body, which fingers taper in direction of their free ends and are stellated in cross-section, the arrangement of the fingers being such that they are capable of simultaneously entering a given number of openings in the plates at one operation of the said tool, as specified.

In testimony whereof I have signed my name to this specification in the presence of two subscribing witnesses.

DAVID BEEBE DATE.

Witnesses:
   EDGAR B. BENNETT,
   MARY E. BENNETT.